July 3, 1951  L. S. HARACZ  2,559,425
AUTOMOTIVE ANTISKID DEVICE
Filed Sept. 25, 1947
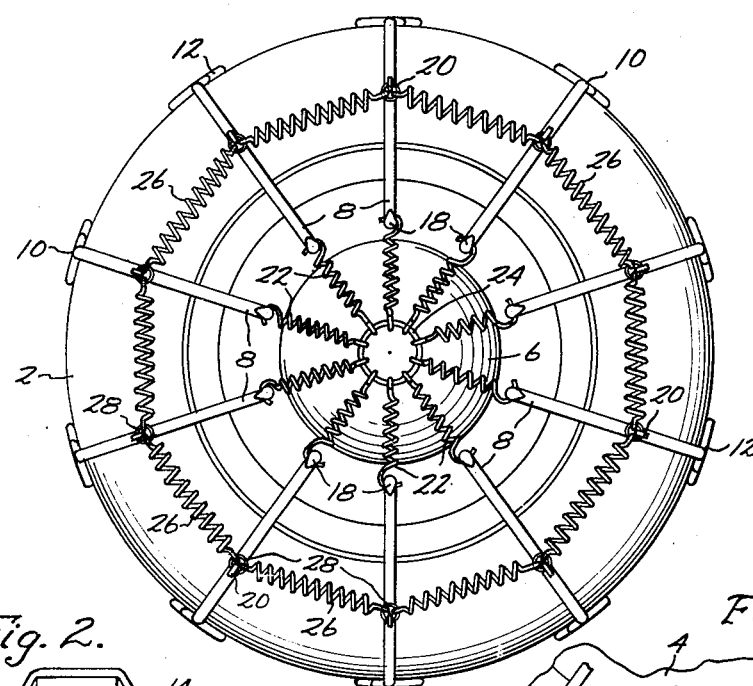
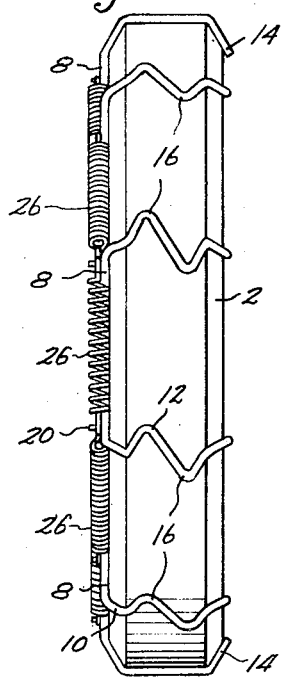
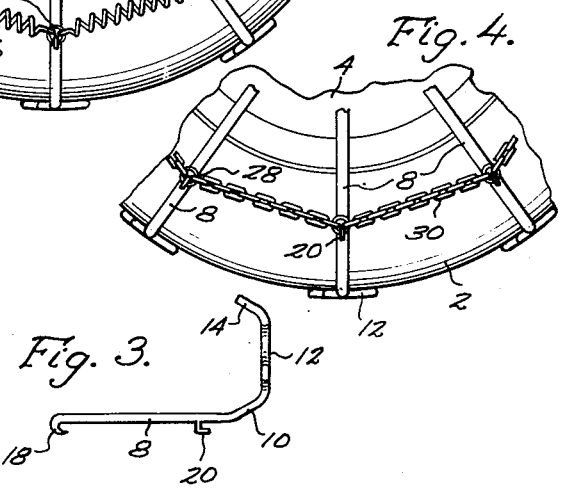
INVENTOR.
Leocadia S. Haracz,
BY *Victor J. Evans & Co.*
ATTORNEYS Patented July 3, 1951

2,559,425

UNITED STATES PATENT OFFICE 2,559,425

AUTOMOTIVE ANTISKID DEVICE

Leocadia S. Haracz, Clifton, N. J.

Application September 25, 1947, Serial No. 776,137

1 Claim. (Cl. 152—225)

My present invention relates to an improved anti-skid device of the type especially adapted for use with automobiles and the primary object is to provide a traction accessory for mud, snow, or ice which may be mounted on the tire without the necessity of jacking the wheels, and further having no chain or other connection to be made on the inside of the tire.

The device may be mounted or removed with facility and without tools, and will effect the necessary traction with a minimum of effort and time in installation and removal.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a front elevational view of the device of my invention mounted on a tire and wheel.

Fig. 2 is a side elevational view.

Fig. 3 is an elevational view of one of the demounted traction elements.

Fig. 4 is a partial side elevational view showing a modified form.

Referring now to the drawings I have illustrated the present preferred embodiment of my invention for use with a tire 2 on a wheel 4 having a hub cap 6.

The traction device consists of a plurality of cleats or units 8 preferably of steel rod bent at 10 to form a hook 12 and the clamp portions 14 which overlies the tire tread and clamps the same.

The hook is fashioned with a zig zag portion 16 to effect a bite or grip in the ground surface, and the arm of the unit has outer integral hooks 18 and 20.

Customarily two of the units are located diametrically of the tire and wheel and secured by springs 22 attached to a hook 18 and to a center ring 24. Then other parts of units are added to the predetermined number best suited in the circumstances and the spaced units are secured by springs 26 having connecting rings 28 mounted on the hooks 20 to prevent circumferential movement of the units under the strain of operation, or chains 30 may be used in lieu of springs 26.

The tension of springs 22 will clamp the opposed units on the tire tread and will prevent the units from slipping off until the springs 22 are removed or detached to permit the removal of the device.

The traction accessory may obviously be mounted with the tire resting on the ground and may be removed under the same circumstances eliminating the usual difficulty of chain mounting which the operator must lie on his back to make the inside connection.

Having thus described and explained my invention what I claim as new and desire to secure by Letters Patent is:

In an anti-skid device for a vehicle wheel, said wheel including a hub cap and tire, said antiskid device comprising a center ring arranged contiguous to said hub cap, a plurality of radially-disposed springs each having an end connected to said ring, a cleat connected to the other end of each of said springs, each of said cleats including a zig-zag portion and a hook portion for engagement with said tire, a hook secured to each of said cleats, and coil springs connecting said cleats together, said coil springs having their ends detachably connected to said hooks.

LEOCADIA S. HARACZ.

REFERENCES CITED

The following references are of record in the file of this patent:

UNITED STATES PATENTS

| Number | Name | Date |
|---|---|---|
| 1,131,116 | Chubbuck | Mar. 9, 1915 |
| 1,142,909 | Purdie | June 15, 1915 |
| 1,213,131 | Penseyres | Jan. 16, 1917 |
| 1,481,232 | Schwiesow | Jan. 15, 1924 |